United States Patent
Fu et al.

(10) Patent No.: US 12,316,503 B2
(45) Date of Patent: May 27, 2025

(54) DATA COMMUNICATION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Yabin Fu, Shenzhen (CN); Huixia Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/460,382

(22) Filed: Sep. 1, 2023

(65) Prior Publication Data

US 2023/0412456 A1 Dec. 21, 2023

Related U.S. Application Data

(63) Continuation of application No. PCT/CN2022/106168, filed on Jul. 18, 2022.

(30) Foreign Application Priority Data

Jul. 30, 2021 (CN) .......................... 202110879479.0

(51) Int. Cl.
*G06F 15/173* (2006.01)
*H04L 41/0823* (2022.01)
*H04L 41/0893* (2022.01)

(52) U.S. Cl.
CPC ...... *H04L 41/0893* (2013.01); *H04L 41/0823* (2013.01)

(58) Field of Classification Search
CPC .......................... H04L 41/0893; H04L 41/0823
See application file for complete search history.

(56) References Cited

U.S. PATENT DOCUMENTS

| | | | |
|---|---|---|---|
| 2008/0318576 A1 | 12/2008 | So et al. | |
| 2018/0131621 A1 | 5/2018 | Wu et al. | |

(Continued)

FOREIGN PATENT DOCUMENTS

| | | | |
|---|---|---|---|
| CN | 101849372 A | 9/2010 | |
| CN | 110719185 A | 1/2020 | |

(Continued)

OTHER PUBLICATIONS

The World Intellectual Property Organization (WIPO) International Search Report for PCT/CN2022/106168 Oct. 9, 2022 7 Pages (including translation).

(Continued)

*Primary Examiner* — Joseph R Maniwang
(74) *Attorney, Agent, or Firm* — ANOVA LAW GROUP, PLLC

(57) ABSTRACT

A data communication method includes: obtaining application data for an application to connect to a public network for data transmission; determining, according to the application data, whether the application needs to connect to a network slice, and in response to determining that the application needs to connect to a network slice, requesting a network operator to create a network slice channel and transmitting the created network slice channel to the application, so that the application switches the connected public network to another network slice corresponding to the network slice channel.

20 Claims, 4 Drawing Sheets

(56) References Cited

U.S. PATENT DOCUMENTS

2021/0306272 A1   9/2021  Liao et al.
2022/0210729 A1   6/2022  Yu
2023/0412456 A1  12/2023  Fu et al.
2024/0097982 A1*  3/2024  Yang ................... H04W 40/02

FOREIGN PATENT DOCUMENTS

| CN | 110855542 A | 2/2020 |
| CN | 111416745 A | 7/2020 |
| CN | 112039699 A | 12/2020 |
| CN | 112367711 A | 2/2021 |
| CN | 112866027 A | 5/2021 |
| CN | 113612640 A | 11/2021 |

OTHER PUBLICATIONS

The State Intellectual Property Office of the People's Republic of China (SIPO) Office Action 1 for 202110879479.0 Feb. 28, 2024 15 Pages (including translation).
Ericsson KI#6, New Solution: Ensuring network control of simultaneous access to network slices with application awareness 3GPP TSG-WG SA2 Meeting #141E e-meeting S2-2007316 Oct. 23, 2020 (Oct. 23, 2020).

* cited by examiner

DATA COMMUNICATION METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2022/106168, entitled "DATA COMMUNICATION METHOD AND APPARATUS, ELECTRONIC DEVICE, AND STORAGE MEDIUM" and filed on Jul. 18, 2022, which claims priority of Chinese Patent Application No. 202110879479.0, entitled "DATA COMMUNICATION METHOD AND APPARATUS, ELECTRONIC DEVICE, AND STORAGE MEDIUM" and filed with the China National Intellectual Property Administration on Jul. 30, 2021, the entire contents of both of which are incorporated herein by reference.

FIELD OF THE TECHNOLOGY

The present disclosure relates to the field of communication technologies, and in particular, to a data communication method and apparatus, an electronic device, and a computer-readable storage medium.

BACKGROUND

Network slicing is a way of networking on demand, and is essentially dividing a physical network of an operator into a plurality of virtual networks according to different service requirements, such as delay, bandwidth, security, and reliability, to flexibly cope with different network application scenarios. Based on the above characteristics of network slicing, using network slicing can provide users with a better network experience.

Currently, a user who wants to use a network slice needs to actively subscribe to a network operator, but the network slice to which the user actively subscribes is a public slice, and there is a probability problem in the network quality obtained through the public slice, which leads to a poor user experience, affecting widespread use of the network slice.

SUMMARY

In order to resolve the above technical problems, embodiments of the application provide a data communication method and apparatus, an electronic device, and a computer-readable storage medium.

According to an aspect of the embodiments of the present disclosure, a data communication method is provided, performed by an electronic device, including: obtaining application data for an application to connect to a public network for data transmission; determining, according to the application data, whether the application needs to connect to a network slice; and in response to determining that the application needs to connect to a network slice, requesting a network operator to create a network slice channel and transmitting the created network slice channel to the application, so that the application switches the connected public network to another network slice corresponding to the network slice channel.

According to an aspect of the embodiments of the present disclosure, a data communication apparatus is provided, including: an application data obtaining module, configured to obtain application data for an application to connect to a public network for data transmission; a network acceleration decision-making module, configured to determine, according to the application data, whether the application needs to connect to a network slice; and a network slice control module, configured to in response to determining that the application needs to connect to a network slice, request a network operator to create a network slice channel, and transmit the created network slice channel to the application, so that the application switches the connected public network to another network slice corresponding to the network slice channel.

According to an aspect of the embodiments of the present disclosure, an electronic device is provided, including at least one processor and at least one memory, the at least one memory storing computer-readable instructions, and the computer-readable instructions, when executed by the at least one processor, performing the data communication method described above.

According to an aspect of the embodiments of the present disclosure, a non-transitory computer-readable storage medium is provided, storing computer-readable instructions, the computer-readable instructions, when executed by at least one processor of a computer, causing the computer to perform the data communication method described above.

In the technical solutions provided in the embodiments of the present disclosure, on one hand, an application that needs to connect to a network slice is identified by analyzing application data, and the application that needs to connect to a network slice is automatically added into the network slice by linking a network operator, so that user coverage of the network slice can be effectively improved, and accurate delivery of the network slice can be implemented. On the other hand, because the linked network operator delivers a dedicated channel corresponding to the network slice to the application, the network quality obtained by the application is more stable compared with a user actively subscribing to a public slice, thereby improving user experience.

It is to be understood that the above general descriptions and the following detailed descriptions are merely exemplary and explanatory and are not intended to limit the present disclosure.

BRIEF DESCRIPTION OF THE DRAWINGS

Accompanying drawings herein are incorporated into the specification and constitute a part of this specification, show embodiments that conform to the present disclosure, and are used for describing a principle of the present disclosure together with this specification. Apparently, the accompanying drawings described below are merely some embodiments of the present disclosure, and a person of ordinary skill in the art may further obtain other accompanying drawings. In the accompanying drawings.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Further: "plurality of" mentioned in the present disclosure means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
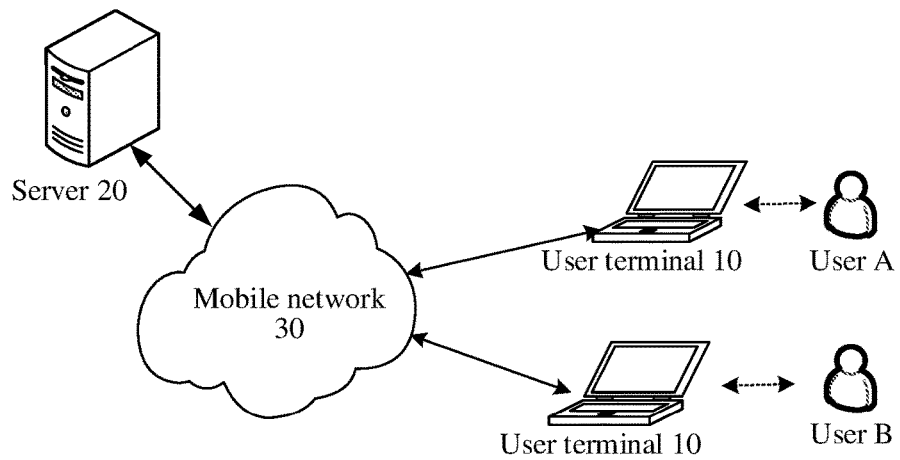
FIG. 1 is a schematic diagram of an implementation environment according to the present disclosure.

First, FIG. 1 is a schematic diagram of an implementation environment according to the present disclosure. The implementation environment includes a user terminal 10 and a server 20, and the user terminal 10 and the server 20 communicate with each other through a mobile network 30 provided by a network operator.

As a network provider, the network operator is configured to provide an end-to-end data transmission network to support end-to-end data transmission. The mobile network 30 provided by the network operator includes a public network and a network slice. The public network refers to a general network, and generally, the mobile network 30 automatically connected to the user terminal 10 is a public network provided by the operator. The network slice is a virtual private network provided by the network operator, and a network provided by the network slice may adapt to network quality requirements in specific application scenarios. Generally, connection of the user terminal 10 to the network slice may incur extra network fees. The network operator is not limited to common network providers such as China Telecom, China Mobile, and China Unicom.

In the implementation environment shown in FIG. 1, the user terminal 10 is connected to the public network provided by the network operator for data transmission, and reports to the server 20 application data such as network signal strength, packet loss rate, and network delay during data transmission based on the public network. The server 20 makes a decision, according to the application data reported by the user terminal 10, on whether the user terminal 10 needs to connect to a network slice to obtain network acceleration, and if yes, the server 20 requests the network operator to create a network slice channel and transmits the created network slice channel to the user terminal 10. The user terminal 10 switches the connected public network to a network slice corresponding to the network slice channel according to the network slice channel delivered by the network operator. It can be seen that in this implementation environment, the server 20 analyzes the application data reported by the user terminal 10 to identify a user who needs network acceleration, and links the network operator to automatically add, into the network slice, the user terminal 10 of the user who needs to obtain network acceleration by connecting to the network slice.

The user terminal 10 may be an electronic device with a network connection function such as a smartphone, a tablet, a notebook computer, or a computer. The server 20 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. This is not limited herein.

Figure 2:
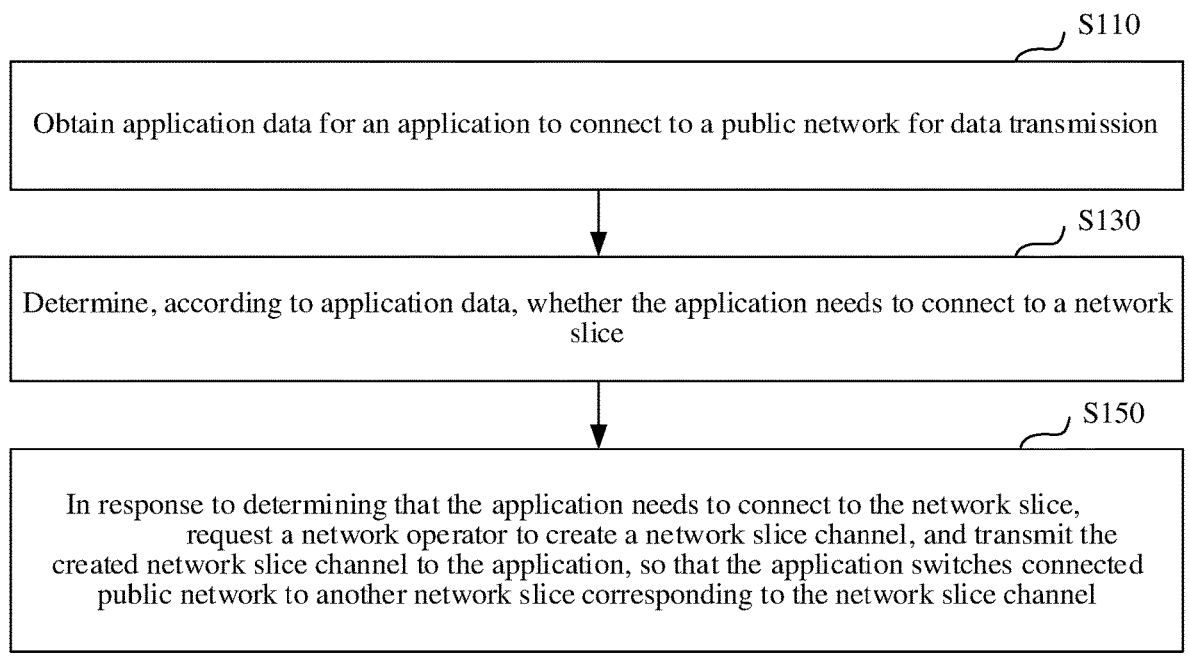
FIG. 2 is a flowchart of a data communication method according to an exemplary embodiment.

FIG. 2 is a flowchart of a data communication method according to an exemplary embodiment. The method may be applied to the implementation environment shown in FIG. 1 and is specifically performed by the server 20 in the implementation environment shown in FIG. 1. In other implementation environments, the method may be performed by other devices such as an electronic device shown in FIG. 8. This is not limited in this embodiment. The data communication method is described in detail below with the server 20 in the embodiment shown in FIG. 1 as an exemplary execution body.

As shown in FIG. 2, the exemplary data communication method may include step S110 to step S150. A detailed description is as follows:

Step S110: Obtain application data for an application to connect to a public network for data transmission.

First, the application in this embodiment refers to an application running on a user terminal, and after the application is connected to a mobile network, data transmission may be performed based on the mobile network. For example, the application includes a video playback application or a cloud gaming application.

The mobile network is a network provided by a network operator, for example, including a public network and a network slice. The public network is an open network provided by the network operator to meet the needs of the public to obtain information, which may also be called a general network. The network slice is a virtual private network provided by the network operator, and a network provided by the network slice may adapt to network quality requirements in specific application scenarios. Generally, the mobile network automatically connected to a user terminal is the public network provided by the network operator, and connection of the user terminal to the network slice may incur extra network fees.

The application data obtained by the server for the application to connect to a public network for data transmission may include a network quality parameter and user attribute parameters. The network quality parameter is used for describing a network quality status of the application during data transmission, and the user attribute parameters describe basic attributes and behavior attributes associated with a user account logged in the application. Exemplarily, the network quality parameter may include a universal unique identifier (UUID), a round-trip time (RTT), a packet loss rate, a bit rate, signal strength, or the like, and the user attribute parameters may include user level, user activity, user online time, and the like, and are not enumerated herein.

In some embodiments, the application reports the application data for data transmission to the server according to a preset frequency, and the server may preprocess the received application data, where the preprocessing includes data cleaning, data analysis, data calculation, and the like, so that a subsequent decision based on the preprocessed application data is more accurate.

Step S130: Determine, according to the application data, whether the application needs to connect to a network slice.

As mentioned above, the network provided by the network slice may adapt to the network quality requirements in specific application scenarios, but, the application connecting to the network slice requires the user to pay extra fees. Therefore, to provide the user with a better application experience and enable the user to better accept paid use of a network slice, it is necessary to make a decision according to the application data of the application on whether the application uses a network slice to obtain a higher quality network service, to accurately cover the network slice to the user, thereby ensuring user experience while improving coverage of the network slice.

Exemplarily, whether the network quality of the application for data transmission based on the public network is poor may be determined according to the application data, and if yes, it is more likely that the user expects to obtain network acceleration through a network slice, thereby determining that the application needs to connect to a network slice.

Alternatively, after it is determined that the network quality of the application for data transmission based on the public network is poor, a further decision that the application needs to connect to a network slice is made according to the user attribute parameters included in the application data. For example, if these user attribute parameters reflect a historical payment behavior of the user in the application, it is more likely that the user obtains network acceleration through a network slice to obtain a better user experience, thereby determining that the application needs to connect to a network slice to obtain network acceleration. A detailed decision-making scheme may be determined according to an actual application scenario, and is not limited herein.

Step S150: In response to determining that the application needs to connect to a network slice, Request a network operator to create a network slice channel, and transmit the created network slice channel to the application, so that the application switches the connected public network to another network slice corresponding to the network slice channel.

As mentioned above, if the decision that the application needs to connect to a network slice is made, it indicates that the user of the application tends to accept using a network slice to obtain better network quality, so that the server requests the network operator to provide a network service of the network slice to the application.

The server obtains a network slice interface provided by the network operator in advance, where the network slice interface provides functions such as creating, registering, exiting slice, and adjusting related parameters, so that the server can link the network operator by calling the network slice interface, to request the network operator to cooperate to implement related network communication scenarios.

The server requests the network operator to create a network slice channel, where the network slice channel is configured to provide a dedicated channel connected to the network slice to the application, and transmits the created network slice channel to the application, so that the application switches the connected public network to a network slice corresponding to the network slice channel. The network slice channel created by the network operator may be a reserved network channel deployed in the nearest base station, bearer network, or core network. A specific deployment position of the network slice channel is not limited in this embodiment.

Exemplarily, the network operator may deliver the created network slice channel to the application based on a UE Route Selection Policy (URSP) rule. The URSP rule describes a correspondence between the application and the network slice, and based on the URSP rule, whether the detected application may be associated with an existing PDU session may be determined or establishment of a new PDU session may be triggered, so that accurate delivery of the network slice can be implemented, to implement network acceleration the application.

It can be seen from the above that in this embodiment, the server identifies an application that needs to connect to a network slice, and the server links the network operator to deliver the network slice to an application that needs network acceleration, so that accurate coverage of the network slice can be implemented, and the network acceleration can be quickly implemented in the application without the user of the application actively subscribing to the network slice. In addition, because the network slice channel delivered by the network operator to the application is a dedicated channel connected to the corresponding network slice, the network quality obtained after the application switches to connect to the network slice can be ensured, and there is no probability problem of the network quality caused by the user actively subscribing to the public slice.

Figure 3:
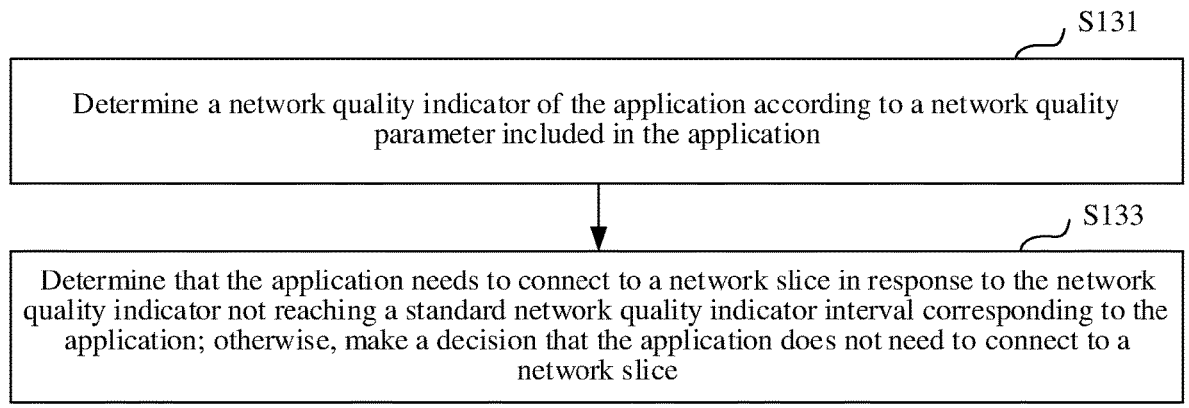
FIG. 3 is a flowchart of step S130 in the embodiment shown in FIG. 2 in an exemplary embodiment.

FIG. 3 is a flowchart of step S130 in the embodiment shown in FIG. 2 in an exemplary embodiment. As shown in FIG. 3, the process of determining, according to the application data, whether the application needs to connect to a network slice may include step S131 to step S133. A detailed description is as follows:

Step S131: Determine a network quality indicator of the application according to a network quality parameter included in the application data.

First, the network quality indicator of the application characterizes transmission performance of the application for data transmission based on the public network. Generally, a higher network quality indicator indicates higher transmission performance of the application for data transmission and a better user experience obtained by the user using the application. However, in actual application scenarios, when the network quality of the network connected to the application reaches a certain level, it can be ensured that the user can obtain a better user experience.

In this embodiment, the objective of determining the network quality indicator of the application according to the network quality parameter included in the application data is to digitize the network quality of the application to conveniently determine based on the network quality indicator whether the application needs to connect to a network slice to obtain network acceleration.

Exemplarily, the network quality indicator of the application may be calculated according to the network quality parameter included in the application data and a preset bit rate of the application. The network quality parameter includes at least one of a round-trip time, a packet loss rate, or a bit rate, and the preset bit rate of the application means that the application can achieve a smooth user experience at the preset bit rate, and different applications have different preset bit rates.

For example, when the application is a cloud gaming application, different types of cloud games have different definition requirements for the game screen. For example, for a first-person shooting game (FPS) type cloud game, the game screen needs to reach super definition to provide the user with a smooth game experience, and a corresponding preset bit rate is 5500 bit/s; for a rhythm-type cloud game, the game screen needs to reach high definition to provide the user with a smooth game experience, and a corresponding preset bit rate is 9000 bit/s; and for a video playback application scenario, a preset bit rate of a video livestreaming application needs to be higher than that of a video playback application. This is not enumerated herein.

If the network quality indicator of the application is represented as F, the round-trip time is represented as A, the packet loss rate is represented as B, the bit rate is represented as C, and the preset bit rate of the application is represented as D, the network quality indicator F of the application can be calculated by the following formula:

$$F = \frac{1}{1 + e^{(0.05*A + 50*B - 0.01*(C-D) - 2)}}$$

In the above formula, a value range of F is [0, 1]. For example, when 0.2<F<1, user experience is good, and when 0<F<0.2, user experience is poor.

In an example, D representing the preset bit rate of the application may be a maximum bit rate and is represented by max_bit_rate. When max_bit_rate=3500, the screen definition corresponding to the application is standard definition. When max_bit_rate=5500, the screen definition corresponding to the application is super definition. When max_bit_rate=9000, the screen definition corresponding to the application is high definition. Users can adjust the value of D according to their own needs and the value of network quality indicator F to adapt to the requirements of different applications.

Step S133: Determine that the application needs to connect to a network slice, in response to the network quality indicator not reaching a standard network quality indicator interval corresponding to the application; otherwise, make a decision that the application does not need to connect to a network slice.

In the standard network quality indicator interval, the user using the application can obtain a good user experience. Although the network quality beyond the standard network quality indicator interval is high, it has no obvious effect on improving user experience, which is equivalent to wasting a network bandwidth. Therefore, different types of applications may correspond to different the standard network quality indicator intervals. Generally, a higher preset bit rate of an application indicates a larger endpoint value of a corresponding standard network quality indicator interval.

In this embodiment, if the network quality indicator of the application does not reach the standard network quality indicator interval corresponding to the application, it indicates that the network quality obtained by the application based on the public network is poor and user experience cannot be ensured. Therefore, it is necessary to perform network acceleration on the application to provide the user with a better application experience. Similarly, if the network quality indicator of the application reaches the standard network quality indicator interval, the application does not need to connect to a network slice to obtain network acceleration.

In another embodiment, after it is determined that the network quality indicator of the application does not reach the standard network quality indicator interval corresponding to the application, user attribute parameters included in the application data may also be obtained to make a further decision according to the user attribute parameters on whether the application needs to connect to a network slice.

The user attribute parameters describe basic attributes and behavior attributes associated with a user account logged in the application. The basic attributes include basic user information such as user age, region, and gender, and the behavior attributes include information such as active information, on-line time, and payment information.

A policy for making a further decision according to the user attribute parameters on whether the application needs to connect to a network slice may be determined specifically according to actual application scenarios. Exemplarily, if the application scenario focuses on payment habits of users, whether a current user has made a historical payment in the application may be determined according to the user attribute parameters. If yes, it indicates that the user has a higher acceptance of paying extra fees to obtain a higher quality network, and therefore it is determined that the application needs to connect to a network slice to obtain network acceleration. Alternatively, if the application scenario focuses on user ages, whether the age of the current user is in an age group that tends to accept network payment services may be determined according to the user attribute parameters, and if yes, it is determined that the application needs to connect to a network slice to obtain network acceleration. In an actual application scenario, there may be one or more focuses, which are not limited herein.

In another exemplary embodiment, after it is determined that the network quality indicator does not reach the standard network quality indicator interval corresponding to the application, a region in which the application is located is further obtained, and a further decision on whether the application needs to connect to a network slice to obtain network acceleration is made based on whether the network operator provides a network slice service in this region. It is to be understood that the application can obtain network acceleration by connecting to a network slice only when the network operator provides a network slice service in this region.

The further decision-making manners in the above examples may be superimposed according to actual application scenarios to meet the requirements of the actual application scenarios, and are not limited herein. Therefore, the server can accurately identify the application that needs network acceleration by making a decision on whether the application needs to connect to a network slice, to lay a foundation for accurate coverage of the network slice.

Figure 4:
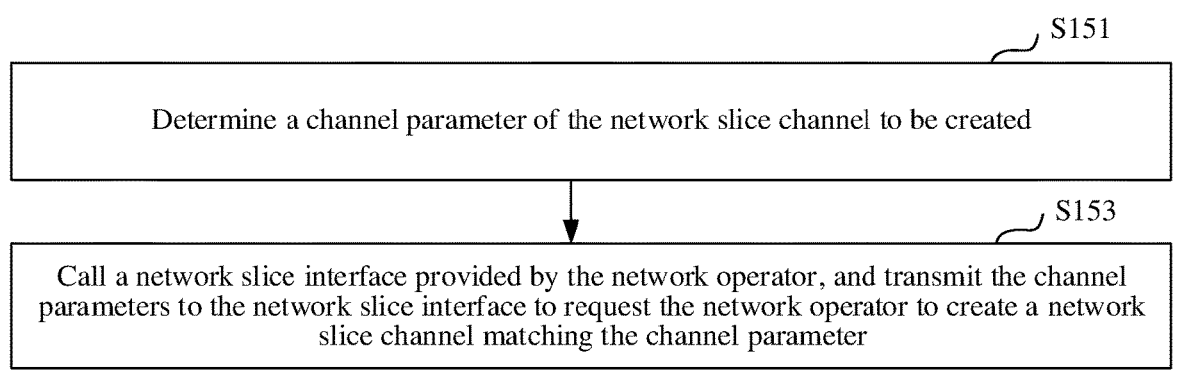
FIG. 4 is a flowchart of step S150 in the embodiment shown in FIG. 2 in an exemplary embodiment.

FIG. 4 is a flowchart of step S150 in the embodiment shown in FIG. 2 in an exemplary embodiment. As shown in FIG. 4, the process in which the server requests a network operator to create a network slice channel and transmits the created network slice channel to the application may include step S151 to step S153. A detailed description is as follows:

Step S151: Determine a channel parameter of a network slice channel to be created.

In order to enable the network acceleration obtained by the application to meet the application requirements without wasting slice resources, a channel parameter of the network slice channel to be created needs to be determined, to request the network operator to create an appropriate network slice channel based on the determined channel parameter.

The server may determine the channel parameter corresponding to the network slice channel to be created according to at least one of a total quantity of applications that connect to the public network in a region in which the application is located and within a specified time period, or a preset bit rate of the application. The channel parameter corresponding to the network slice channel may include at least one of a channel size or a connection period.

Exemplarily, if a total quantity of applications that connect to the public network in n region in which the application is located and within a specified time period is large, a connection period may be set as a corresponding time period, so that the terminal switches the connected public network to a network corresponding to the network slice channel within this time period after receiving the network slice channel delivered by the network operator. For example, if 7 p.m. to 9 p.m. is the time period where the public network is congested, the connection period may be set between 7 p.m. to 9 p.m. A specified frequency may be further set for the connection period. For example, the connection period is from 7 p.m. to 9 p.m. every night, to control the frequency and the period for the application to connect to the network slice, so that not only network resources of the network slice are reduced, but also user experience is further optimized.

Because the application can achieve a smooth user experience at the preset bit rate, in order to provide the user with a good user experience after the application switches to connect to a network slice, the channel size of the network slice channel created by the network operator needs to at least provide a corresponding network bandwidth, so that the channel size of the network slice channel can be determined according to the preset bit rate of the application.

Step S153: Call a network slice interface provided by the network operator, and transmit the channel parameter to the network slice interface to request the network operator to create a network slice channel matching the channel parameter.

After the channel parameter corresponding to the network slice channel to be created is determined, the network slice interface provided by the network operator is called and the channel parameter is transmitted to the network slice interface, to request the network operator to create a network slice channel matching the channel parameter.

In this embodiment, the channel parameter is determined in the server based on the above process, and the network operator is requested to create the corresponding network slice channel based on the determined channel parameter, so that the created network slice channel can implement network acceleration of the application without causing a waste of network slice resources.

Figure 5:
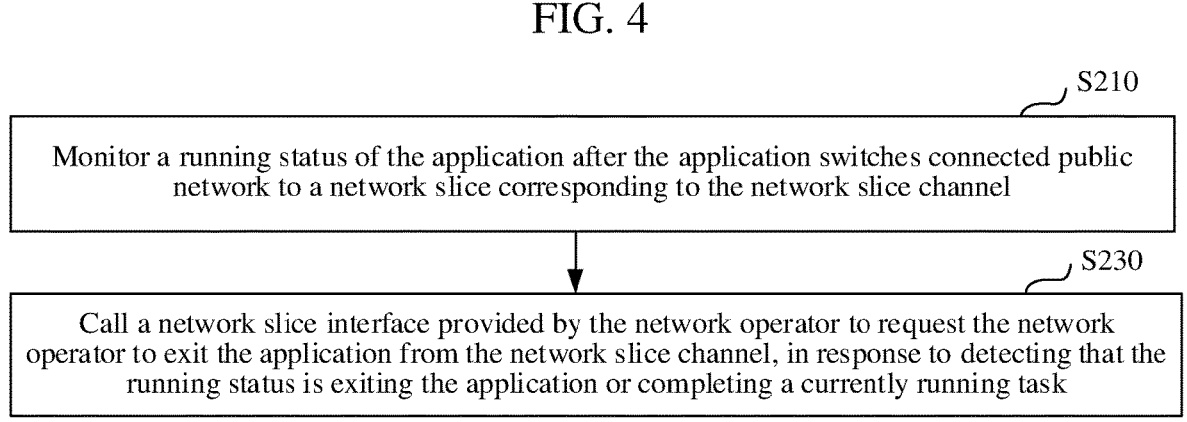
FIG. 5 is a flowchart of a data communication method according to another exemplary embodiment of the present disclosure.

FIG. 5 is a flowchart of a data communication method according to another exemplary embodiment of the present disclosure. As shown in FIG. 5, the method includes step S210 to step S230 based on the steps shown in FIG. 2. A detailed description is as follows:

Step S210: Monitor a running status of the application after the application switches the connected public network to the network slice corresponding to the network slice channel.

In this embodiment, after switching the connected public network to the network slice corresponding to the network slice channel, the application still transmits the application data for data transmission based on the network slice to the server, and the monitoring of the running status of the application can be implemented according to the application data.

Step S230: Call a network slice interface provided by the network operator to request the network operator to exit the application from the network slice channel, in response to detecting that the running status is exiting the application or completing a currently running task.

The network slice interface provided by the network operator is called to request the network operator to exit the application from the network slice channel, in response to monitoring that the running status is exiting the application or completing a currently running task, to avoid a waste of slice resources and avoid network payment required each time the user logs in the application, thereby better improving user experience.

It can be seen that a server-linked network operator in this embodiment can not only implement dynamic entering of the user into a network slice, but also implement dynamic exiting of the user from a network slice, so that not only network slice resources can be reduced, but also user experience can be greatly improved.

In another embodiment, a network quality indicator for the application to connect to a network slice for data transmission may be further obtained, and the network quality indicator for the application to connect to a network slice for data transmission may be compared with a network quality indicator for the application to connect to a public network for data transmission to obtain a comparison result. Based on the comparison result, the network quality before and after entering a slice can be clearly compared, and the improved effect of user experience can be evaluated in an actual application scenario. The comparison result may be presented on the application of the corresponding client device. The comparison result may also be reported to a server corresponding to the application and/or the network operator.

The data communication method provided by this embodiment of the present disclosure is described below in detail by using a cloud gaming system as an exemplary application scenario.

A cloud game is an online gaming technology based on a cloud computing technology. The cloud gaming technology enables terminal devices with relatively limited graphics processing and data computing capabilities to run high-quality games. In a cloud gaming scenario, the cloud game does not run in a game terminal of a user, but runs on a cloud server, which renders game scenes into video and audio streams, and transmits the video and audio streams to a cloud gaming client installed on a player game terminal through a network. The player game terminal does not need to have powerful graphics operation and data processing capabilities, and only needs to have a basic streaming media playback capability and a capability of obtaining user input instructions and transmitting the instructions to the cloud server.

The cloud game has extremely high requirements for network quality, especially delay and jitter. If the network quality is poor, it may affect a cloud gaming experience, such as an outcome of a match and look-and-feel of the screen. Therefore, if the data communication method provided by this embodiment of the present disclosure is applied to a cloud gaming scenario, the game experience of the user can be better ensured, and the reputation of the cloud game can be improved.

In a specific example, a data structure of the network quality reported by the cloud gaming client is shown in Table 1. According to different requirements, the data structure of the network quality reported by the cloud gaming client may be flexibly adjusted.

TABLE 1

| | |
|---|---|
| report_time | data report time |
| uuid | user id |
| server_ip | server IP |
| Manufacturer | mobile phone manufacturer |
| os_type | system type |
| os_version | system version |
| Rtt | network delay (null over 200 ms) |
| Netaccesstype | network type |
| Netprottype | network protocol (IPv4/IPv6) |
| client_isp | client network operator |
| client_province | client province |
| client_city | client city |

The exemplary cloud gaming system includes a cloud gaming application running on a terminal and a cloud gaming server, and the cloud gaming application and the cloud gaming server communicate with each other based on a mobile network provided by a network operator. The mobile network provided by the network operator includes a public network and a network slice, and the network operator provides a network slice interface for the cloud gaming server to call. A cloud gaming data platform service program and a decision-making service program are disposed in the cloud gaming server.

Figure 6:
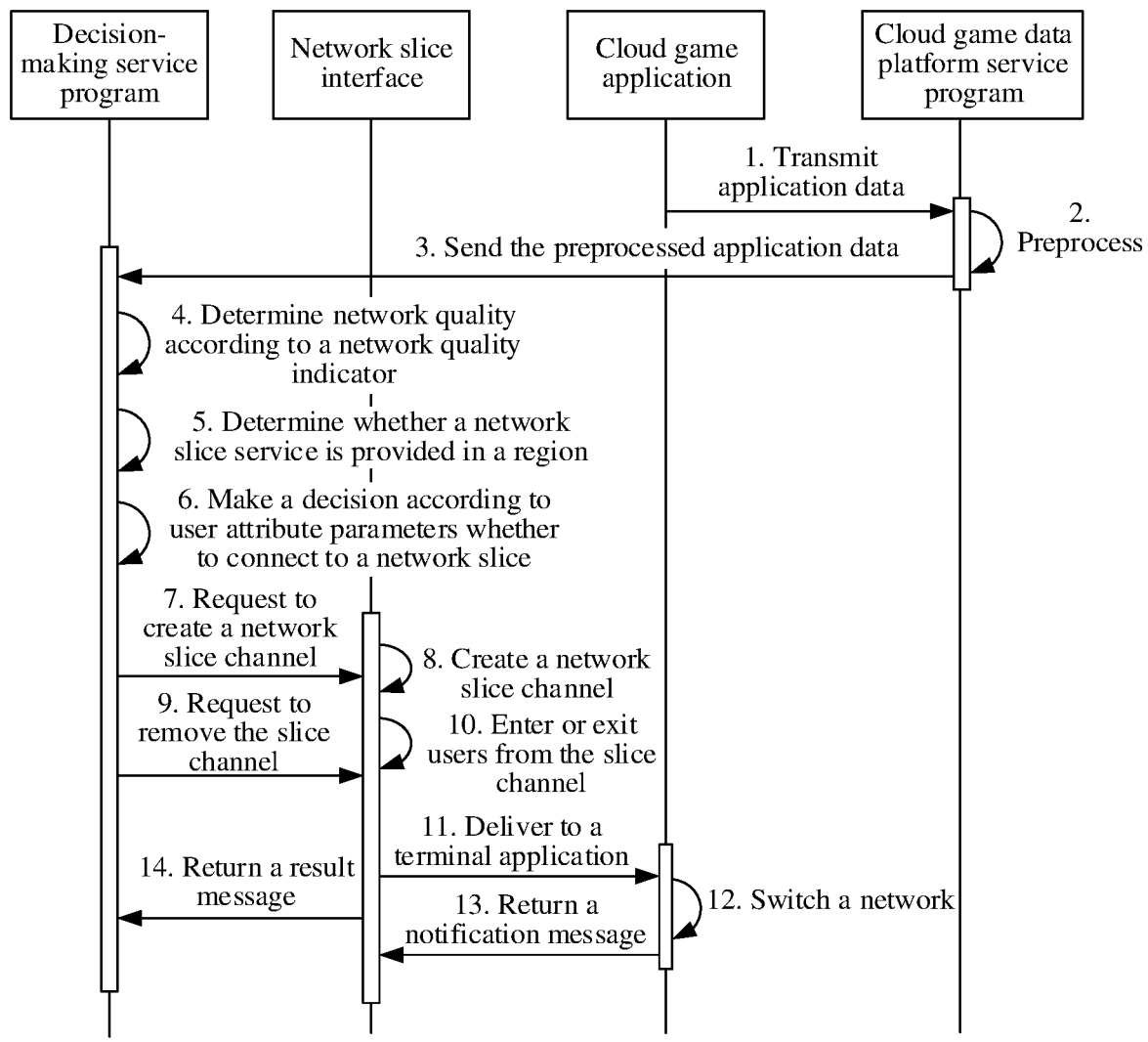
FIG. 6 is a schematic flowchart of an exemplary cloud gaming system implementing a data transmission method.

A process in which the exemplary cloud gaming system performs a data transmission method is shown in FIG. 6. Specifically, referring to FIG. 6, the cloud gaming application transmits application data to the cloud gaming server. The application data is obtained by the cloud gaming application connecting to a public network for data transmission, and includes at least one of a network quality parameter or user attribute parameters.

The cloud gaming data platform program disposed in the cloud gaming server preprocesses the application data uploaded by the cloud gaming application, where the preprocessing includes data cleaning, data analysis, data calculation, and the like, and is not limited herein.

The preprocessed application data is transmitted to the decision-making service program disposed in the cloud gaming server to make a decision on whether the cloud gaming application needs to connect to a network slice. As shown in FIG. 6, that the decision-making service program makes a decision on whether the cloud gaming application needs to connect to a network slice may include the following process:

First, a network quality indicator of the cloud gaming application is determined according to the network quality parameter included in the application data. If it is determined based on the network quality indicator that the network quality of the cloud gaming application is high, whether a region in which the cloud gaming application is located provides a network slice service is further determined. If it is determined that the network operator provides a network slice service in the region, a further decision on whether the cloud gaming application needs to connect to a network slice to obtain network acceleration is made according to the user attribute parameters included in the application data.

A network slice interface provided by the network operator is called to request the network operator to create a network slice channel, and the created network slice channel is sent to the cloud gaming application, in response to determining that the cloud gaming application needs to connect to a network slice. The network slice channel is configured to provide a dedicated channel for connecting to a network slice for the cloud gaming application. For a detailed decision-making process, refer to the description in the foregoing embodiments. This is not repeated herein.

The cloud gaming application switches a connected public network to a corresponding network slice based on the received network slice channel, for data transmission based on the network slice switched to be connected. After completing the network switching, the cloud gaming application returns a notification message to the network operator, and the network operator returns a result message to the cloud gaming server based on the notification message.

If the decision-making service program monitors that the cloud gaming application exits a game or completes a game match, the network slice interface may be called again to request the network operator to exit the cloud gaming application from the current network slice channel.

It can be seen that in the present disclosure, users with poor network quality is identified through analysis of background data of a cloud game, and a network slice provider is linked in the background to enable users to dynamically enter or exit a dedicated slice of the cloud game, so that not only user experience can be improved, but also network slice resources can be reduced.

Figure 7:
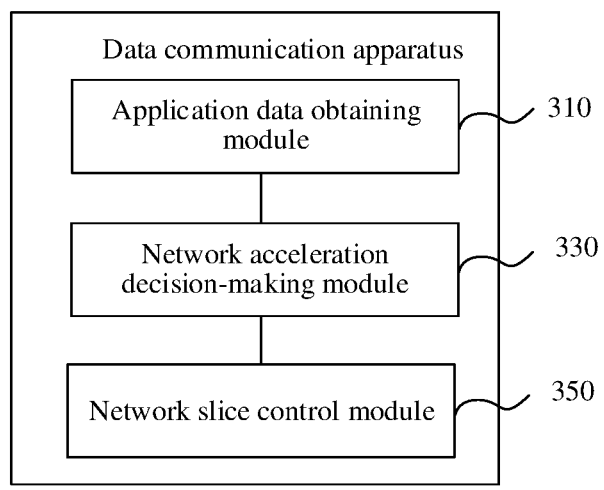
FIG. 7 is a block diagram of a data communication apparatus according to an exemplary embodiment of the present disclosure.

FIG. 7 is a block diagram of a data communication apparatus according to an exemplary embodiment of the present disclosure. The data communication apparatus may be applied to the implementation environment shown in FIG. 1 and is specifically performed by the server 20 in the implementation environment shown in FIG. 1.

As shown in FIG. 7, the data communication apparatus includes:

an application data obtaining module 310, configured to obtain application data for an application to connect to a public network for data transmission; a network acceleration decision-making module 330, configured to make a decision according to application data on whether the application needs to connect to a network slice; and a network slice control module 350, configured to request a network operator to create a network slice channel and transmit the created network slice channel to the application, in response to determining that the application needs to connect to a network slice channel, so that the application switches from the connected public network to a network slice corresponding to the network slice channel, where the network slice channel is configured to provide a dedicated channel for the application to connect to a network slice.

On one hand, the apparatus identifies a user who needs to connect to a network slice to obtain network acceleration by analyzing application data, and links a network operator to automatically add an application of the user who needs network acceleration into the network slice, so that user coverage of the network slice can be effectively improved, and accurate delivery of the network slice can be implemented. On the other hand, because the linked network operator delivers a dedicated channel corresponding to the network slice to the application, the network quality obtained by the application is more stable compared with a user actively subscribing to a public slice, thereby improving user experience.

In another exemplary embodiment, the network acceleration decision-making module includes:
an indicator determining unit, configured to determine a network quality indicator of the application according to a network quality parameter included in the application data, where the network quality indicator characterizes transmission performance of the application for data transmission based on the public network; and a first decision-making unit, configured to make a decision that the application needs to connect to a network slice, in response to the network quality indicator not reaching a standard network quality indicator interval corresponding to the application, where different types of applications correspond to different standard network quality indicator intervals; and make a decision that the application does not need to connect to a network slice in response to the network quality indicator reaching the standard network quality indicator interval.

In another exemplary embodiment, the indicator determining unit includes:
a parameter obtaining subunit, configured to obtain the network quality parameter included in the application data and determine a preset bit rate of the application, where the network quality parameter includes at least one of a round-trip time, a packet loss rate, or a bit rate, and the application can achieve a smooth user experience at the preset bit rate; and an indicator calculation unit, configured to calculate the network quality indicator of the application according to the network quality parameter and the preset bit rate.

In another exemplary embodiment, the network acceleration decision-making module includes:
a user attribute parameter obtaining unit, configured to obtain user attribute parameters included in the application data after it is determined that the network quality indicator does not reach the standard network quality indicator interval corresponding to the application, where the user attribute parameters describe basic attributes and behavior attributes associated with a user account logged in the application; and a second decision-making unit, configured to make a further decision according to the user attribute parameters on whether the application requires network acceleration.

In another exemplary embodiment, the network acceleration decision-making module includes:
a region determining unit, configured to obtain a region in which the application is located after it is determined that the network quality indicator does not reach the standard network quality indicator interval corresponding to the application; and a third decision-making unit, configured to make a further decision on whether the application needs to connect to a network slice, based on whether the network operator provides a network slice service in the region.

In another exemplary embodiment, the network slice control module includes:
a channel parameter determining unit, configured to determine a channel parameter of a network slice channel to be created, where the channel parameter includes at least one of a channel size or a connection period; and an interface calling module, configured to call a network slice interface provided by the network operator and transmit the channel parameter to the network slice interface to request the network operator to create a network slice channel matching the channel parameter.

In another exemplary embodiment, the apparatus further includes:
a running status monitoring module, configured to monitor a running status after the application switches the connected public network to the network slice corresponding to the network slice channel; and an exit processing module, configured to call, when it is monitored that the running status is exiting the application or completing a currently running task, a network slice interface provided by the network operator to request the network operator to exit the application from the network slice channel.

In another exemplary embodiment, the apparatus further includes:
an indicator obtaining and comparison module, configured to obtain a network quality indicator for the application to connect to a network slice for data transmission; and compare the network quality indicator for the application to connect to a network slice for data transmission with a network quality indicator for the application to connect to a public network for data transmission to obtain a comparison result.

The apparatus provided by the foregoing embodiment and the method provided by the foregoing embodiments belong to the same concept, and the specific manners of performing operations by the modules and units of the apparatus have been described in detail in the method embodiments. Details are not described again herein.

An embodiment of the present disclosure further provides an electronic device, including a processor and a memory, the memory storing computer-readable instructions, and the computer-readable instructions, when executed by the processor, implementing the data communication method described above.

Figure 8:
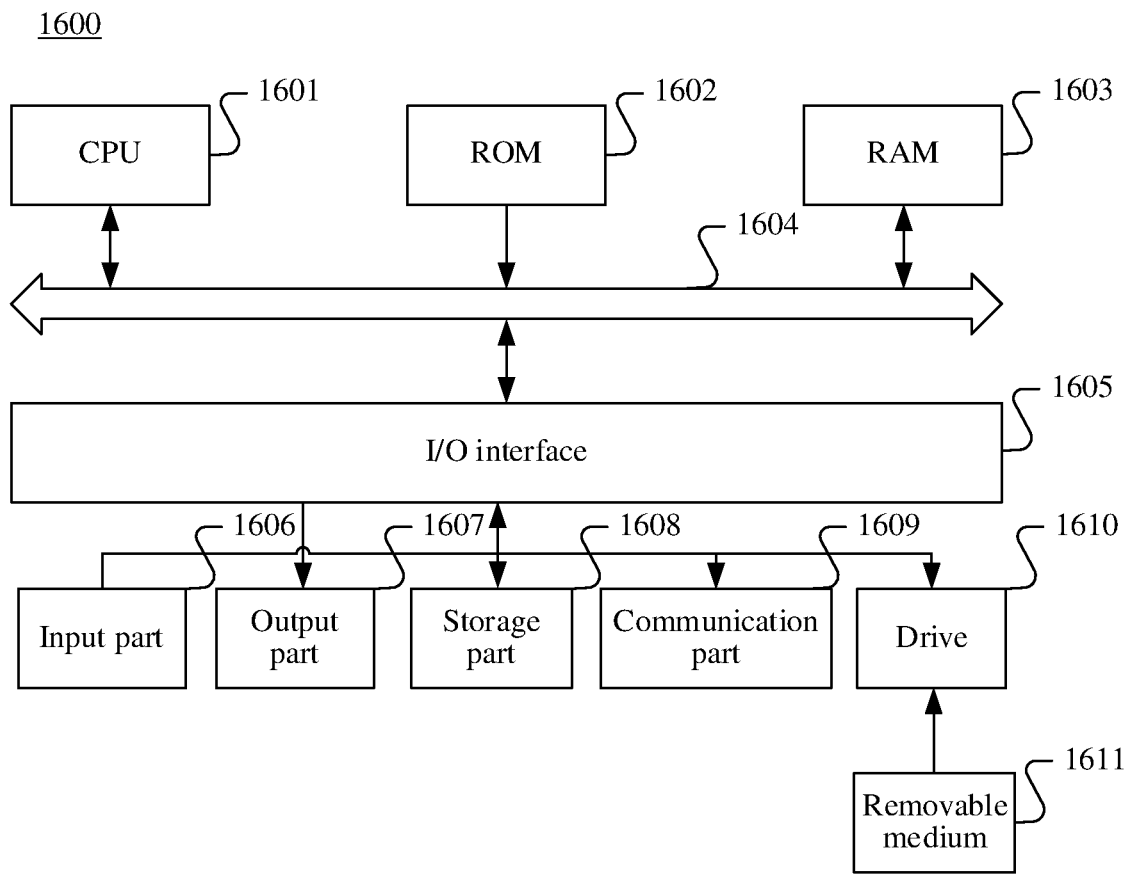
FIG. 8 is a schematic structural diagram of a computer system adapted to implement an electronic device according to an embodiment of the present disclosure.

FIG. 8 is a schematic structural diagram of a computer system adapted to implement an electronic device according to an embodiment of the present disclosure.

The computer system 1600 of the electronic device shown in FIG. 8 is merely an example, and does not constitute any limitation on functions and use ranges of the embodiments of the present disclosure.

As shown in FIG. 8, the computer system 1600 includes a central processing unit (CPU) 1601, which may perform various suitable actions and processing according to a program stored in a read-only memory (ROM) 1602 or a program loaded from a storage part 1608 into a random access memory (RAM) 1603, for example, perform the method described in the foregoing embodiments. The RAM 1603 further stores various programs and data required for system operations. The CPU 1601, the ROM 1602, and the RAM 1603 are connected to each other through a bus 1604. An input/output (I/O) interface 1605 is also connected to the bus 1604.

The following components are connected to the I/O Interface 1605: an input part 1606 including a keyboard, a mouse, or the like; an output part 1607 including a cathode ray tube (CRT), a liquid crystal display (LCD), and a speaker, or the like; a storage part 1608 including a hard disk, or the like; and a communication part 1609 including a network interface card such as a local area network (LAN) card or a modem. The communication part 1609 performs communication processing by using a network such as the Internet. A drive 1610 is also connected to the I/O interface 1605 as required. A removable medium 1611, such as a magnetic disk, an optical disc, a magneto-optical disk, or a semiconductor memory, is installed on the drive 1610 as required, so that a computer program read from the removable medium is installed into the storage portion part 1608 as required.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1609, and/or installed from the removable medium 1611. When the computer program is executed by the CPU 1601, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, an electrical, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal propagated in a baseband or as part of a carrier, and carries a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions configured to implement designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of blocks in the block diagram or the flowchart may be implemented by using a dedicated hardware-based system configured to perform a specified function or operation, or may be implemented by using a combination of dedicated hardware and a computer instruction.

Related units described in the embodiments of the present disclosure may be implemented in a software manner, or may be implemented in a hardware manner, and the units described can also be set in a processor. Names of these units do not constitute a limitation on the units in a specific case.

Another aspect of the present disclosure further provides a computer-readable storage medium, storing a computer program, the computer program, when executed by a processor, implementing the data communication method as described above. The computer-readable storage medium may be included in the electronic device described in the foregoing embodiment, or may exist alone and is not disposed in the electronic device.

Another aspect of the present disclosure further provides a computer program product or a computer program, including computer instructions, the computer instructions being stored in a computer-readable storage medium. A processor of a computer device reads the computer instructions from the computer-readable storage medium, and the processor executes the computer instructions so that the computer device performs the data communication method provided in the embodiments described above.

The foregoing content is merely preferable exemplary embodiments of the present disclosure, and is not intended to limit the embodiments of the present disclosure. A person of ordinary skill in the art can easily make corresponding changes or modifications according to the main concept and spirit of the present disclosure. Therefore, the protection scope of the present disclosure shall be subject to the protection scope of the claims.

What is claimed is:

1. A data communication method, performed by an electronic device, comprising:
    obtaining application data for an application connected to a public network for data transmission;
    determining, according to the application data, whether the application needs to connect to a network slice; and
    in response to determining that the application needs to connect to a network slice, requesting a network operator to create a network slice channel and transmitting the created network slice channel to the application, so that the application switches the connected public network to another network slice corresponding to the network slice channel.

2. The method according to claim 1, wherein the determining, according to the application data, whether the application needs to connect to a network slice comprises:
    determining a network quality indicator of the application according to a network quality parameter comprised in the application data, wherein the network quality indicator characterizes transmission performance of the application for data transmission based on the public network;
    determining that the application needs to connect to a network slice, in response to the network quality indicator not reaching a standard network quality indicator interval corresponding to the application, wherein different types of applications correspond to different standard network quality indicator intervals; and determining that the application does not need to connect to a network slice, in response to the network quality indicator reaching the standard network quality indicator interval, wherein the network slice channel is configured to provide the application with a dedicated channel for connecting to the network slice.

3. The method according to claim 2, wherein the determining a network quality indicator of the application according to a network quality parameter comprised in the application data comprises:

obtaining the network quality parameter comprised in the application data and determining a preset bit rate of the application, wherein the network quality parameter comprises at least one of a round-trip time, a packet loss rate, or a bit rate, and the application achieves smooth user experience at the preset bit rate; and calculating the network quality indicator of the application according to the network quality parameter and the preset bit rate.

4. The method according to claim 3, wherein the network quality indicator of the application is determined according to the round-trip time, the packet loss rate, and a difference between a bit rate and the preset bit rate.

5. The method according to claim 2, further comprising:
obtaining user attribute parameters comprised in the application data after determining that the network quality indicator does not reach the standard network quality indicator interval corresponding to the application, wherein the user attribute parameters describe basic attributes and behavior attributes associated with a user account logged in the application; and determining, according to the user attribute parameters, whether the application needs to connect to a network slice.

6. The method according to claim 2, further comprising:
obtaining a region in which the application is located after determining that the network quality indicator does not reach the standard network quality indicator interval corresponding to the application; and determining whether the application needs to connect to a network slice, based on whether the network operator provides a network slice service in the region.

7. The method according to claim 1, wherein the requesting a network operator to create a network slice channel and transmitting the created network slice channel to the application comprises:

determining a channel parameter of a network slice channel to be created, wherein the network slice channel is configured to provide the application with a dedicated channel for connecting to the network slice, and the channel parameter comprises at least one of a channel size or a connection period; and calling a network slice interface provided by the network operator, and transmitting the channel parameter to the network slice interface to request the network operator to create a network slice channel matching the channel parameter.

8. The method according to claim 7, wherein the determining a channel parameter of a network slice channel to be created comprises:

determining the channel parameter according to at least one of a total quantity of applications that connect to the public network in a region in which the application is located and within a specified time period, or a preset bit rate of the application.

9. The method according to claim 1, further comprising:
monitoring a running status of the application after the application switches the connected public network to the network slice corresponding to the network slice channel, wherein the network slice channel is configured to provide the application with a dedicated channel for connecting to the network slice; and calling a network slice interface provided by the network operator to request the network operator to exit the application from the network slice channel, in response to detecting that the running status is exiting the application or completing a currently running task.

10. The method according to claim 1, further comprising:
obtaining a network quality indicator for the application to connect to a network slice for data transmission; and comparing the network quality indicator for the application to connect to a network slice for data transmission with a network quality indicator for the application to connect to a public network for data transmission to obtain a comparison result.

11. The method according to claim 1, wherein the network operator transmits the created network slice channel to the application according to a UE Route Selection Policy (URSP) rule.

12. A data communication apparatus, comprising:
at least one memory, storing computer-readable instructions; and at least one processor, configured to execute the computer-readable instructions stored in the at least one memory to obtain application data for an application connected to a public network for data transmission;

determine, according to the application data, whether the application needs to connect to a network slice; and in response to determining that the application needs to connect to a network slice, request a network operator to create a network slice channel and transmit the created network slice channel to the application, so that the application switches the connected public network to another network slice corresponding to the network slice channel.

13. The apparatus according to claim 12, wherein the at least one processor is further configured to:

determine a network quality indicator of the application according to a network quality parameter comprised in the application data, wherein the network quality indicator characterizes transmission performance of the application for data transmission based on the public network; and determine that the application needs to connect to a network slice, in response to the network quality indicator not reaching a standard network quality indicator interval corresponding to the application, wherein different types of applications correspond to different standard network quality indicator intervals; and determine that the application does not need to be connected to the network slice, in response to the network quality indicator reaching the standard network quality indicator interval, wherein the network slice channel is configured to provide the application with a dedicated channel for connecting to the network slice.

14. The apparatus according to claim 13, wherein the at least one processor is further configured to:

obtain the network quality parameter comprised in the application data and determine a preset bit rate of the application, wherein the network quality parameter comprises at least one of a round-trip time, a packet loss rate, or a bit rate, and the application achieves smooth user experience at the preset bit rate; and calculate the network quality indicator of the application according to the network quality parameter and the preset bit rate.

15. The apparatus according to claim 13, wherein the at least one processor is further configured to:

obtain user attribute parameters comprised in the application data after determining that the network quality indicator does not reach the standard network quality indicator interval corresponding to the application, wherein the user attribute parameters describe basic attributes and behavior attributes associated with a user account logged in the application; and determine, according to the user attribute parameters, whether the application requires network acceleration.

16. The apparatus according to claim 13, wherein the at least one processor is further configured to:

obtain a region in which the application is located after it is determined that the network quality indicator does not reach the standard network quality indicator interval corresponding to the application; and determine whether the application needs to connect to a network slice, based on whether the network operator provides a network slice service in the region.

17. The apparatus according to claim 12, wherein the at least one processor is further configured to:

determine a channel parameter of the network slice channel to be created, wherein the channel parameter comprise at least one of a channel size or a connection period; and call a network slice interface provided by the network operator, and transmit the channel parameter to the network slice interface to request the network operator to create a network slice channel matching the channel parameter, wherein the network slice channel is configured to provide the application with a dedicated channel for connecting to the network slice.

18. The apparatus according to claim 17, wherein the at least one processor is further configured to:

determine the channel parameter according to at least one of a total quantity of applications that connect to the public network in a region in which the application is located and within a specified time period, or a preset bit rate of the application.

19. The apparatus according to claim 12, wherein the at least one processor is further configured to:

monitor a running status of the application after the application switches the connected public network to the network slice corresponding to the network slice channel, wherein the network slice channel is configured to provide the application with a dedicated channel for connecting to the network slice; and call a network slice interface provided by the network operator to request the network operator to exit the application from the network slice channel, in response to detecting that the running status is exiting the application or completing a currently running task.

20. A non-transitory computer-readable storage medium, storing computer-readable instructions, the computer-readable instructions, when executed by at least one processor of a computer, causing the computer to perform:

obtaining application data for an application connected to a public network for data transmission;

determining, according to the application data, whether the application needs to connect to a network slice; and in response to determining that the application needs to connect to a network slice, requesting a network operator to create a network slice channel and transmitting the created network slice channel to the application, so that the application switches the connected public network to another network slice corresponding to the network slice channel.

* * * * *